(12) United States Patent
Szpunar

(10) Patent No.: US 9,057,226 B2
(45) Date of Patent: Jun. 16, 2015

(54) METHOD OF FORMING A MACHINABLE SURFACE

(75) Inventor: Stephen Jude Szpunar, Fulshear, TX (US)

(73) Assignee: Vetco Gray Inc., Houston, TX (US)

( * ) Notice: Subject to any disclaimer, the term of this patent is extended or adjusted under 35 U.S.C. 154(b) by 466 days.

(21) Appl. No.: 13/463,386

(22) Filed: May 3, 2012

(65) Prior Publication Data

US 2013/0292132 A1 Nov. 7, 2013

(51) Int. Cl.
*E21B 7/12* (2006.01)
*E21B 17/08* (2006.01)
*F16L 15/00* (2006.01)
*F16L 15/08* (2006.01)

(52) U.S. Cl.
CPC ............. *E21B 17/085* (2013.01); *F16L 15/001* (2013.01); *F16L 15/08* (2013.01)

(58) Field of Classification Search
CPC .............................. E21B 17/085; E21B 33/038
USPC .............................. 166/360, 367; 285/18, 333
See application file for complete search history.

(56) References Cited

U.S. PATENT DOCUMENTS

| | | | | |
|---|---|---|---|---|
| 2,062,407 | A * | 12/1936 | Eaton | 285/334 |
| 4,366,971 | A * | 1/1983 | Lula | 285/55 |
| 5,028,081 | A * | 7/1991 | Fournier | 285/334.4 |
| 7,270,732 | B2 | 9/2007 | Chang et al. | |
| 2003/0047588 | A1 | 3/2003 | Filippov et al. | |
| 2004/0239105 | A1 | 12/2004 | Matsumoto et al. | |
| 2008/0264644 | A1* | 10/2008 | Sawtell | 166/350 |
| 2009/0250927 | A1* | 10/2009 | Pallini et al. | 285/334.2 |
| 2010/0253076 | A1* | 10/2010 | Beard et al. | 285/333 |
| 2010/0320754 | A1* | 12/2010 | Hashem et al. | 285/333 |
| 2011/0133448 | A1* | 6/2011 | Williams et al. | 285/333 |
| 2011/0193338 | A1 | 8/2011 | Carter | |

OTHER PUBLICATIONS

GB Search and Examination Report dated Oct. 21, 2013 from corresponding GB Application No. GB1307833.2.

* cited by examiner

*Primary Examiner* — Matthew Buck
*Assistant Examiner* — Aaron Lembo
(74) *Attorney, Agent, or Firm* — Bracewell & Giuliani LLP

(57) ABSTRACT

A riser assembly and method of forming where the riser assembly is made up of tubular members joined together. A metal spray process applies a layer of cladding onto ends of the tubular members and the ends are threaded to form respective box and pin configurations. Grooves are provided onto the surface of the tubular members beneath where the metal spray is applied for enhancing adhesion of the cladding and tubular members. The layer of cladding provides sufficient material so that threads may be selectively formed on the outer or the inner surface of the tubular members.

14 Claims, 4 Drawing Sheets

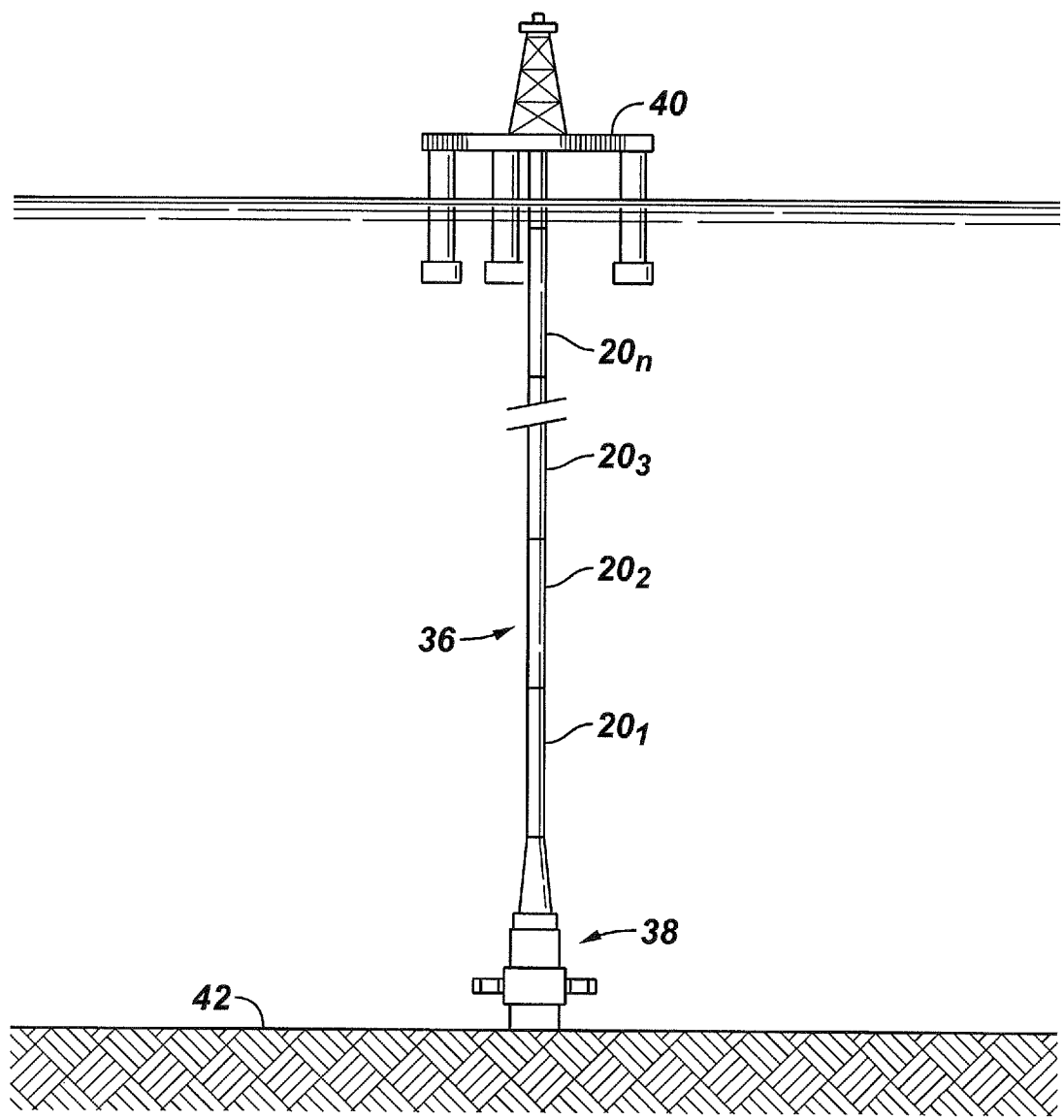

METHOD OF FORMING A MACHINABLE SURFACE

BACKGROUND

1. Field of Invention

The invention relates generally to a riser assembly. More specifically, the invention relates to a string of tubular members and method of making, where a substrate is deposited onto the ends of the members after grooves have been formed in the ends, the ends are threaded, and the members are threaded together.

2. Description of Prior Art

Offshore drilling operations are typically performed through a drilling riser that extends between a subsea wellhead assembly at the seafloor and a drilling vessel. Drilling risers are usually made up of a number of individual tubulars attached to each other end to end to form a string. Ends of the tubulars are often threaded so that adjacent tubulars can be attached by engaging their respective threaded ends, where a smaller diameter pin end threadingly inserts into a larger diameter box end. Typically, the box ends diameters are increased by a separate upset forging process to provide material for machining threads thereon.

SUMMARY OF THE INVENTION

Provided herein is an example of a riser string and a method of forming a riser string. In one example described herein is a riser string having a first tubular with a box end and grooves on an outer surface proximate the box end. A metal cladding is on the grooves, and threads are on an inner surface of the box end. Also included is a second tubular with a pin end that is inserted into the box end with grooves on an outer surface proximate the pin end and cladding over the grooves. Threads on the outer surface of the pin end are engaged with the threads on the inner surface of the box end. The grooves on the first tubular may optionally each have a height that decreases with distance from a terminal end of the box end and a width that increases with distance from a terminal end of the box end. Grooves on the second tubular may each have a height that decreases with distance from a terminal end of the pin end and a width that increases with distance from a terminal end of the pin end. In an example, the grooves on the first tubular are shaped like a trapezoid with a bottom end distal from the outer surface of the box end, an opening at the outer surface of the box end having a length greater than the bottom end, and converging sides that extend from the opening to the bottom end. Optionally, the grooves on the second tubular are shaped like a trapezoid with a bottom end distal from the outer surface of the pin end, an opening at the outer surface of the pin end having a length greater than the bottom end, and converging sides that extend from the opening to the bottom end. Adjacent grooves on the first tubular may be separated by a space that increases with distance from a terminal end of the box end. In an alternative, adjacent grooves on the first tubular are separated by a space that decreases with distance from a terminal end of the box end.

Also described herein is a method of forming a riser string that includes forming grooves onto end portions of tubulars and depositing a layer of metal cladding onto the end portions of the tubulars and over the grooves. Threads are provided on an inner surface of an end of a tubular to form a box end along with threads on an outer surface of an end of a tubular to form a pin end. Threads on the pin end are engaged with threads on the box end to define a connection. In one example, the steps of forming the grooves, threads, and engaging the threads are repeated with additional tubulars. In an example, the step of forming the grooves involves forming a helical groove proximate an end of the tubular, the groove having a triangular shaped cross section. Optionally, the grooves are formed by forming a helical groove proximate an end of the tubular, the groove having a castellated shaped cross section. Forming the grooves may alternatively involve forming a series of trapezoidal shaped grooves that have a successively decreasing depth with distance from a terminal end of the tubular. The step of depositing a layer of metal cladding onto the end portions of the tubulars and over the grooves may use cuttings taken from one of the tubulars.

BRIEF DESCRIPTION OF DRAWINGS

Some of the features and benefits of the present invention having been stated, others will become apparent as the description proceeds when taken in conjunction with the accompanying drawings, in which:

FIG. 6 is a side view of an example of a riser connected between a subsea wellhead and a platform in accordance with the present invention.

Figure 1:
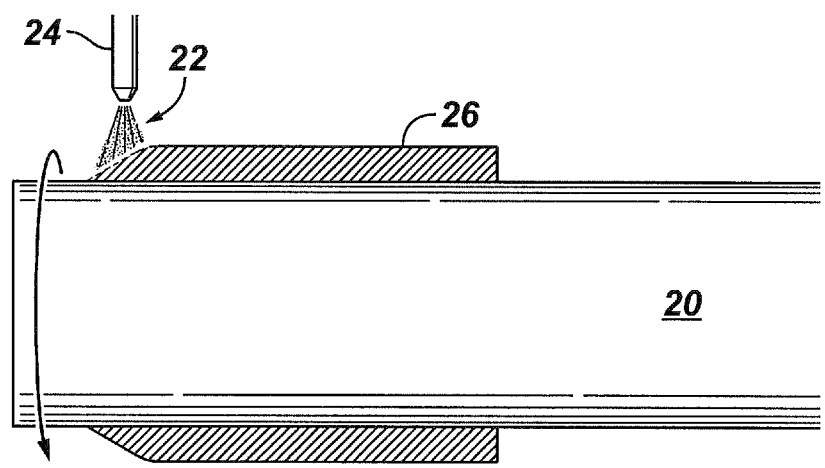
FIG. 1 is a side partial sectional view of an example of applying a metal spray to a tubular in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

Shown in side view in FIG. 1 is an example of applying a cladding material to a tubular 20 where a spray 22 is directed from a spray gun 24 onto an outer surface of the tubular 20. In the example of FIG. 1, the tubular 20 is rotated while applying the spray 22 thereby forming a spray deposit 26 on the tubular 20 and in a designated location on the tubular 20. In an embodiment, the spray deposit 26 onto the tubular 20 is applied using a metal spray process. One example of a metal spray process is found in Carter, U.S. Patent Application Publication No. US 2011/0193338, having application Ser. No. 12/702,340, which is assigned to the assignee of the present application and incorporated by reference herein in its entirety for all purposes. The spray 22 may be a metal spray, and in an example the metal spray can include cuttings or other debris removed from the tubular 20 during its machining.

Figure 2:
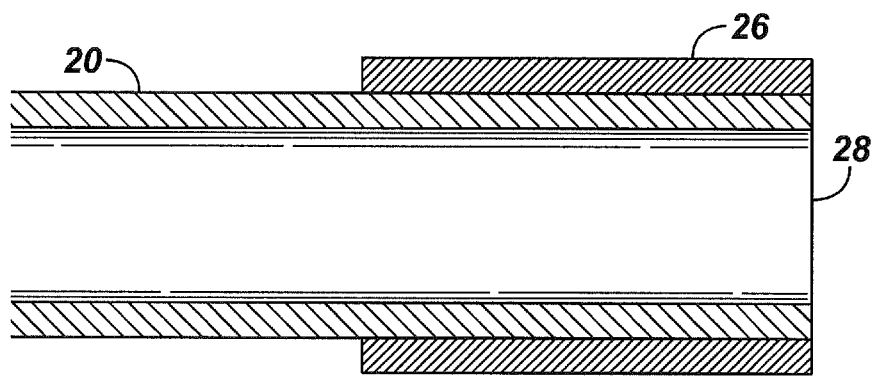
FIG. 2 is a side sectional view of an example of the tubular of FIG. 1 and having a metal spray substrate in accordance with the present disclosure.
Figure 3A:
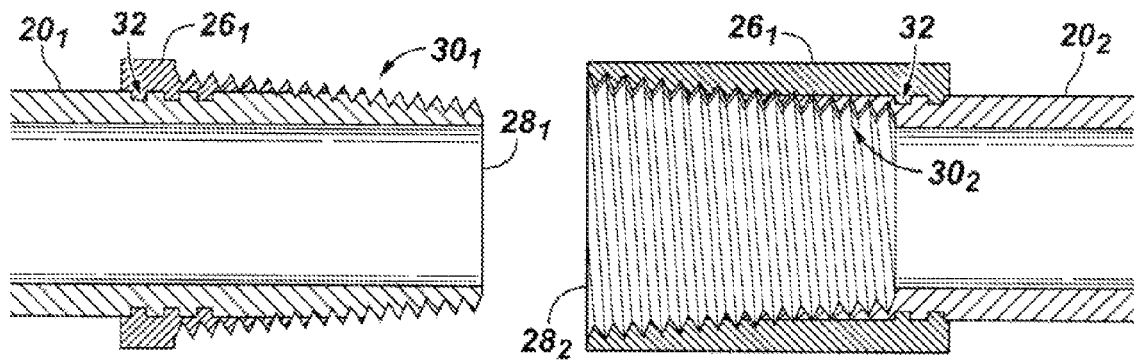
FIG. 3A is a side sectional view of an embodiment of tubulars having a metal spray substrate and threaded ends in accordance with the present invention.
Figure 3B:
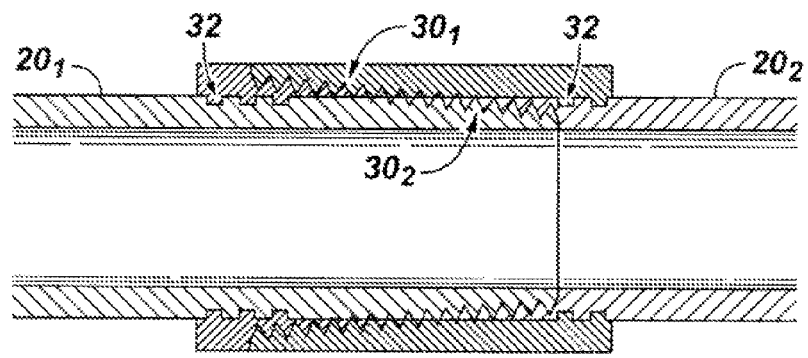
FIG. 3B is a side sectional view of the tubulars of FIG. 3A in threaded engagement in accordance with the present invention.

FIG. 2 is a side sectional view of an example of the tubular 20 having a spray deposit 26 on the outer surface of the tubular 20 and adjacent an end 28 of the tubular 20. Embodiments exist however, wherein the spray deposit 26 extends substantially the length of the outer surface of the tubular 20. Referring now to FIG. 3A, tubulars $20_{1,2}$ are shown each with spray deposits $26_{1,2}$ formed on their respective ends $28_{1,2}$. Further illustrated in FIG. 3A are threads $30_1$ formed on the outer surface of the spray deposit $26_1$ thereby forming a pin end on the tubular $20_1$. Similarly, threads $30_2$ are shown formed on an inner surface of the tubular $20_2$ thereby forming a box end in tubular $20_2$. In the example of FIG. 3A, the machining forming the threads $30_{1,2}$ may cut entirely through the spray deposits $26_{1,2}$ in a radial direction and into the tubulars $20_{1,2}$ along a portion of the length of the spray deposits $26_{1,2}$. As shown in the example of FIG. 3B, an advantage of the spray deposit method described herein is that tubulars $20_{1,2}$ having substantially the same inner and outer diameters may be threaded together by interlocking threads $30_{1,2}$ formed on the spray deposits $26_{1,2}$. This is an advantage over coaxially connecting tubulars with unions on an outer surface and/or an upset forging process.

Figure 4:
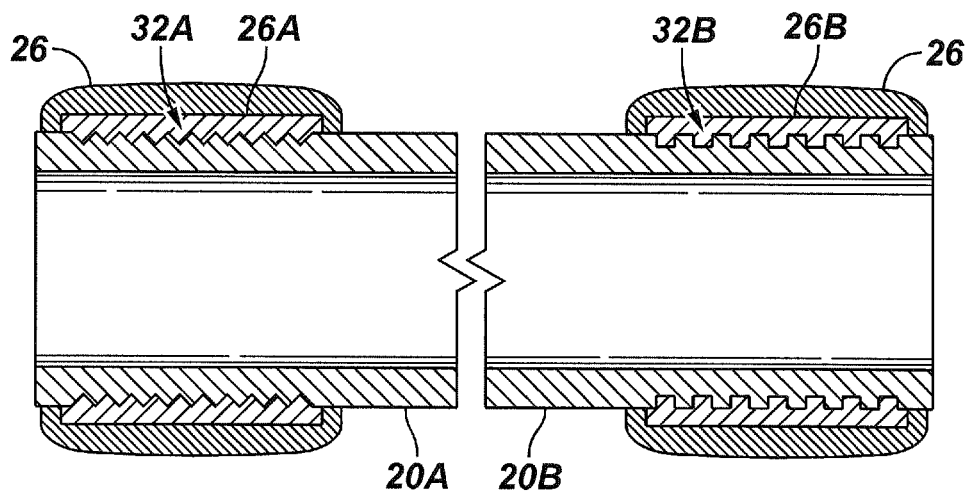
FIG. 4 is a side sectional view of tubulars having profiled surfaces with the metal spray applied over the profiled surfaces in accordance with the present invention.

In an optional embodiment as shown in side sectional view in FIG. 4, outer surfaces of tubulars 20A, 20B are treated with grooves 32A, 32B so that when a spray 22 is deposited over the grooves 32A, 32B, the spray deposits 26A, 26B have increased adhesion properties over that with a surface of a tubular having little or no profile. More specifically, grooves 32A are made up of a repeating series of adjacently positioned upwardly pointed teeth that resemble a saw tooth-like configuration. When the spray 22 (FIG. 1) is deposited over the grooves 32A, the lower portions of the spray deposit 26A reside between adjacent teeth of the grooves 32A. Grooves 32B, which are shown as a repeating castellated configuration, may or may not have a consistent lengthwise distance between successive or adjacent teeth within the grooves 32B. In one example embodiment, after initially applying spray 22 (FIG. 1), an axial cross section of the spray deposit 26 is semi-elliptically shaped and can be machined to have a general planar upper surface with forward and aft surfaces extending generally perpendicular from an axis $A_X$ of tubular 20A.

Figure 5:
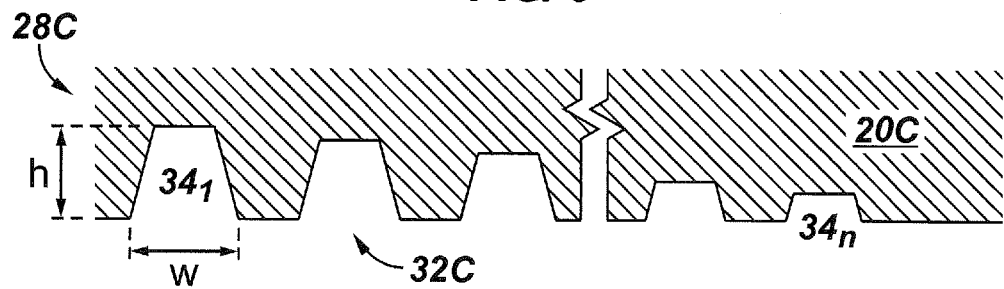
FIG. 5 is a side view of an alternate embodiment of a profiled surface on a tubular in accordance with the present invention.

Referring now to FIG. 5, a side sectional view of an example of grooves 32C is shown wherein the groove members $34_{1-n}$ have a trapezoidal-like cross-section. In the example of FIG. 5, the groove members $34_{1-n}$ are formed into an outer surface of the tubular 20C and may each have a height and width that changes with respect to adjacent groove members. In the specific example of FIG. 5, groove member $34_1$ has a height greater than other groove members $34_{2-n}$ making up the grooves 32C. The sequentially reduced heights between the groove members $34_{1-n}$ may follow a generally linear function, or may optionally be nonlinear as well. In the example of FIG. 5, the groove members $34_{1-n}$ having the larger height and width are located proximate an end 28C of the tubular 20C. However, the order may be reversed so that groove members $34_{1-n}$ adjacent or more proximate the end 28C may have a height exceeded by other groove members in the grooves 32C. The shape of the grooves 32C can be set with a more obtuse angle to improve density and adhesion of the metal spray, and also so that the metal spray contacts as much surface area as possible to prevent shadowing.

Referring now to FIG. 6, an example of a riser 36 is shown deployed subsea, wherein the riser 36 is made up of a series of tubulars $20_{1-n}$ that extend from a wellhead assembly 38 subsea and up to a platform 40. In the example of FIG. 6, the wellhead assembly 38 is shown mounted on a sea floor 42 wherein the platform 40 is above sea surface, and may be floating or may have legs (not shown) mounted on the sea floor 42.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A riser string comprising:
   a first tubular having a length, substantially constant inner and outer diameters along the length, a box end, grooves on an outer surface proximate the box end, a metal cladding on the outer surface of the first tubular and that extends into the grooves, and threads on an inner surface of the box end; and
   a second tubular having a pin end inserted into the box end, grooves on an outer surface proximate the pin end, a metal cladding on the outer surface of the second tubular and that extends into the grooves, and threads on an outer surface of the metal cladding engaged with the threads on the inner surface of the box end.

2. The riser string of claim 1, wherein the grooves on the first tubular each have a height that decreases with distance from a terminal end of the box end and a width that increases with distance from a terminal end of the box end.

3. The riser string of claim 1, wherein the grooves on the second tubular each have a height that decreases with distance from a terminal end of the pin end and a width that increases with distance from a terminal end of the pin end.

4. The riser string of claim 1, wherein the grooves on the first tubular comprise a trapezoid with a bottom end distal from the outer surface of the box end, an opening at the outer surface of the box end having a length greater than the bottom end, and converging sides that extend from the opening to the bottom end.

5. The riser string of claim 1, wherein the grooves on the second tubular comprise a trapezoid with a bottom end distal from the outer surface of the pin end, an opening at the outer surface of the pin end having a length greater than the bottom end, and converging sides that extend from the opening to the bottom end.

6. The riser string of claim 1, wherein adjacent grooves on the first tubular are separated by a space that increases with distance from a terminal end of the box end.

7. The riser string of claim 1, wherein adjacent grooves on the first tubular are separated by a space that decreases with distance from a terminal end of the box end.

8. A method of forming a riser string comprising:
   a. forming grooves onto end portions of tubulars;
   b. depositing a layer of metal cladding onto the end portions of the tubulars and over the grooves;
   c. providing threads on an inner surface of an end of a one of the tubulars that cut through the layer of metal cladding into material making up the tubular and to form a box end;
   d. providing threads on an outer surface of an end of another one of the tubulars that cut through the layer of metal cladding into material making up the tubular and to form a pin end; and
   e. engaging threads on the pin end with threads on the box end to define a connection.

9. The method of claim 8, further comprising repeating steps (c)-(e).

10. The method of claim 8, wherein the step of forming the grooves comprises forming a helical groove proximate an end of the tubular, the groove having a triangular shaped cross section.

11. The method of claim 8, wherein the step of forming the grooves comprises forming a helical groove proximate an end of the tubular, the groove having a castellated shaped cross section.

12. The method of claim 8, wherein the step of forming the grooves comprises forming a series of trapezoidal shaped grooves that have a successively decreasing depth with distance from a terminal end of the tubular.

13. The method of claim 8, wherein the step of depositing a layer of metal cladding onto the end portions of the tubulars and over the grooves uses cuttings taken from one of the tubulars.

14. The method of claim 8, wherein the shape of the grooves are set at an obtuse angle to improve density and adhesion of the metal cladding, and also so that the metal cladding contacts as much surface area as possible to prevent shadowing.

* * * * *